(12) United States Patent
Kimura et al.

(10) Patent No.: US 10,975,712 B2
(45) Date of Patent: Apr. 13, 2021

(54) BRUSH SEAL

(71) Applicant: Eagle Industry Co., Ltd., Tokyo (JP)

(72) Inventors: Wataru Kimura, Tokyo (JP); Takeshi Hosoe, Tokyo (JP); Hideyuki Inoue, Tokyo (JP); Toru Kono, Tokyo (JP)

(73) Assignee: EAGLE INDUSTRY CO., LTD.

( * ) Notice: Subject to any disclaimer, the term of this patent is extended or adjusted under 35 U.S.C. 154(b) by 243 days.

(21) Appl. No.: 16/072,856

(22) PCT Filed: Feb. 15, 2017

(86) PCT No.: PCT/JP2017/005401
§ 371 (c)(1),
(2) Date: Jul. 25, 2018

(87) PCT Pub. No.: WO2017/141929
PCT Pub. Date: Aug. 24, 2017

(65) Prior Publication Data
US 2018/0371928 A1   Dec. 27, 2018

(30) Foreign Application Priority Data

Feb. 16, 2016   (JP) .............................. JP2016-027305

(51) Int. Cl.
*F16J 15/32*   (2016.01)
*F01D 11/00*   (2006.01)
(Continued)

(52) U.S. Cl.
CPC ............ *F01D 11/003* (2013.01); *F01D 11/00* (2013.01); *F01D 11/12* (2013.01); *F16J 15/22* (2013.01);
(Continued)

(58) Field of Classification Search
CPC ...... F16J 15/3288; F16J 15/3292; F16J 15/22; F01D 11/003; F01D 11/00; F01D 11/12; F05D 2240/56
See application file for complete search history.

(56) References Cited

U.S. PATENT DOCUMENTS

| 4,403,779 A | 9/1983 | Wilkinson ..................... 277/27 |
| 5,884,918 A | 3/1999 | Basu et al. .................... 277/355 |

(Continued)

FOREIGN PATENT DOCUMENTS

| CN | 101713301 | 5/2010 | ............. F01D 11/02 |
| CN | 103174835 | 6/2013 | ............. F16J 15/16 |

(Continued)

OTHER PUBLICATIONS

Chinese Office Action (w/translation) issued in application No. 201780008735.0, dated Feb. 28, 2020 (11 pgs).

(Continued)

*Primary Examiner* — Vishal A Patel
(74) *Attorney, Agent, or Firm* — Hayes Soloway P.C.

(57) ABSTRACT

Provided is a brush seal in which the leakage of a sealed fluid is small. The brush seal includes: a brush formed of a bunch of a plurality of bristles; and an annular back plate arranged at a low-pressure side of the brush and provided with a plurality of grooves into which a sealed fluid is to be introduced. In the brush seal, the plurality of grooves are inclined with respect to a circumferential direction of the back plate and with respect to an extending direction (B) of the brush.

2 Claims, 9 Drawing Sheets

(51) Int. Cl.
*F16J 15/22* (2006.01)
*F16J 15/3288* (2016.01)
*F01D 11/12* (2006.01)

(52) U.S. Cl.
CPC ....... *F16J 15/3288* (2013.01); *F05D 2240/56* (2013.01)

(56) References Cited

U.S. PATENT DOCUMENTS

| | | | | |
|---|---|---|---|---|
| 6,840,518 B2 * | 1/2005 | Boston | ................ | F16J 15/3288 277/355 |
| 7,255,352 B2 * | 8/2007 | Adis | ................ | F16J 15/3288 277/355 |
| 7,980,562 B2 * | 7/2011 | Williams | ............ | F01D 11/001 277/355 |
| 8,439,364 B2 * | 5/2013 | Bowsher | ................ | F16J 15/44 277/355 |
| 9,752,448 B2 | 9/2017 | Inoue | ................ | F01D 11/005 |
| 2002/0050684 A1 | 5/2002 | Kono | ............. | 277/355 |
| 2006/0214378 A1 * | 9/2006 | Zheng | ................ | F16J 15/3288 277/355 |
| 2008/0007010 A1 * | 1/2008 | Williams | ............ | F01D 11/001 277/355 |
| 2010/0164177 A1 * | 7/2010 | Zheng | ................ | F16J 15/006 277/355 |

FOREIGN PATENT DOCUMENTS

| | | | | |
|---|---|---|---|---|
| CN | 104114917 | 10/2014 | ............. | F01D 11/01 |
| EP | 0617216 | 9/1994 | ............. | F16J 15/32 |
| JP | 2002139154 | 5/2002 | ............. | A46B 9/08 |
| JP | 2008039180 | 2/2008 | ............. | F01D 11/00 |
| WO | WO2006104514 | 10/2006 | ............. | F16J 15/44 |

OTHER PUBLICATIONS

Korean Office Action (w/translation) issued in application No. 10-2018-7023259, dated Nov. 18, 2019 (12 pgs).

Extended European Search Report issued in application No. 17753185.2, dated Aug. 23, 2019 (7 pgs).

Chinese Office Action issued in application No. 201780008735.0, dated Jun. 24, 2019 (13 pgs).

International Search Report and Written Opinion (w/translation) issued in application No. PCT/JP2017/005401, dated May 9, 2017 (12 pgs).

International Preliminary Report on Patentability (w/translation) issued in application No. PCT/JP2017/005401, dated Aug. 21, 2018 (12 pgs).

* cited by examiner

BRUSH SEAL

TECHNICAL FIELD

The present invention relates to a brush seal for sealing a clearance between two members, rotating relative to each other, of a rotary machine such as a turbine.

BACKGROUND ART

A seal is used in a rotary machine such as a turbine in order to prevent gas from leaking along a circumference of a rotor from a high-pressure side to a low-pressure side. It is desired that the seal follows variations of a clearance between a stator and the rotor of the rotary machine or follows the eccentricity of the stator and the rotor to exert sealing performance. From this aspect, a brush seal formed of a bunch of ultrathin bristles has been adopted instead of a labyrinth seal.

As shown in FIG. 7, a conventional brush seal 100 mainly includes: a brush 102 which is formed of a bunch of ultrathin bristles; a side plate 105 at a high-pressure side H; and a back plate 107 at a low-pressure side L. The brush 102 is pushed against the back plate 107 by the pressure of a sealed, fluid when a rotary machine is operating. Accordingly, if a clearance is generated between the rotor 109 and an end of the brush 102 due to the heat expansion or eccentricity of the rotor 109, the brush. 102 may not smoothly move and thus the follow-up ability which the brush seal 100 originally has cannot be fully exerted. For this reason, a circumferential groove 108 is formed in the back plate 107 and the sealed fluid is introduced into the circumferential groove 108. Consequently, balance pressure is applied from the side of the back plate 107 to the brush 102 to reduce the force by which the brush 102 is pushed against the back plate 107, thereby enabling the foregoing follow-up ability to be retained. Such a conventional brush seal has been proposed (see, for example, Patent Citation 1).

CITATION LIST

Patent Literature

Patent Literature 1: Japanese Unexamined Patent Application Publication No. 2002-139154 (paragraph 0033, FIG. 1)

SUMMARY OF INVENTION

Technical Problem

However, the brush seal disclosed in the Patent Literature 1 is configured such that the circumferential groove 108 is circumferentially arranged in the back plate 107 to allow the balance pressure to act on the brush 102. Accordingly, when the brush 102 is pushed against the back plate 107 as a pressure difference between the high-pressure side H and the low-pressure side L increases, a portion of the brush 102 enters the circumferential groove 108 to be bent and therefore the end of the brush 102 moves in such a direction to separate from the rotor 109. Accordingly, a gap g is generated, beyond expectation, between the brush 102 and the rotor 109; therefore, the sealed fluid leaking through the gap g may increase (see FIG. 8).

Also, another brush seal 100 shown in the Patent Literature 1 is configured such that an annular supporting portion 110 is provided at a radially center portion of the circumferential groove 108, thereby reducing the deformation amount of the brush 102. Likewise, as described above, a portion of the brush 102 enters the circumferential groove 108 to be bent as the pressure of the high-pressure side H increases; therefore, the end of the brush 102 may separate from the rotor 109. Further, the supporting portion 110 is provided at the radially center portion and the brush 102 is brought into contact with the supporting portion 110 when the rotary machine is in use. Therefore, the brush 102 may be worn by the contact portion of the supporting portion 110.

The present invention is thus made in view of such problems, and it is an object of the present invention to provide a brush seal in which the leakage of a sealed fluid can be small.

Solution to Problem

In order to solve the foregoing problems, a brush seal according to a first aspect of the present invention including: a brush formed of a bunch of a plurality of bristles; and an annular back plate arranged at a low-pressure side of the brush and provided with the plurality of grooves into which a sealed fluid is to be introduced, is characterized in that the plurality of grooves are inclined with respect to a circumferential direction of the back plate and with respect to an extending direction of the brush.

According to the first aspect, the grooves are inclined and therefore a lot of grooves are arranged in opposition to any row of axially aligned bristles of the brush. This means that the brush is axially supported by many more lands each of which is located between the grooves and in contact with the blush. Thus, an axial deflection of the brush small and the leakage of the sealed fluid can be inhibited.

The brush seal according to a second aspect of the present invention is characterized in that the plurality of grooves are formed in the same shape and arranged at equal intervals in the circumferential direction.

According to the second aspect, the fluid pressure acting from the grooves on the brush uniformly acts in the extending direction of the brush; therefore, the axial deflection of the brush can be further reduced.

The brush seal according to a third aspect of the present invention is characterized in that the plurality of grooves are formed separately from each other in a non-continuous manner.

According to the third aspect, a land is located to continuously extend around the grooves, thereby surely storing the sealed fluid in the grooves.

The brush seal according to a fourth aspect of the present invention is characterized in that a land continuously extending in the circumferential direction is formed at a radially inner side of the plurality of grooves of the back plate.

According to the fourth aspect, the sealed fluid introduced into the grooves can be inhibited from flowing to the low-pressure side.

The brush seal according to a fifth aspect of the present invention is characterized in that the brush and the plurality of grooves are inclined to the opposite sides from each other with respect to a radial direction of the back plate.

According to the fifth aspect, many more grooves can be arranged in opposition to any row of the axially aligned bristles of the brush.

The brush seal according to a sixth aspect of the present invention is characterized in that the plurality of grooves are provided to be inclined at 45 degrees with respect to the circumferential direction of the back plate.

According to the sixth aspect, far more grooves can be arranged in opposition to any row of the axially aligned bristles of the brush.

BRIEF DESCRIPTION OF DRAWINGS

FIG. 5 comparatively illustrates the movement of the brush due to the inclination angle of a groove and FIG. 5(a) and FIG. 5(b) are views, respectively, illustrating a case where the brush is inclined at 45 degrees and a case where the brush is inclined at 60 degrees;

DESCRIPTION OF EMBODIMENTS

Modes for carrying out a brush seal according to the present invention will be described below on the basis of embodiments.

First Embodiment

The first embodiment of the brush seal according to the present invention will be described with reference to FIG. 1 to FIG. 5.

Figure 1:
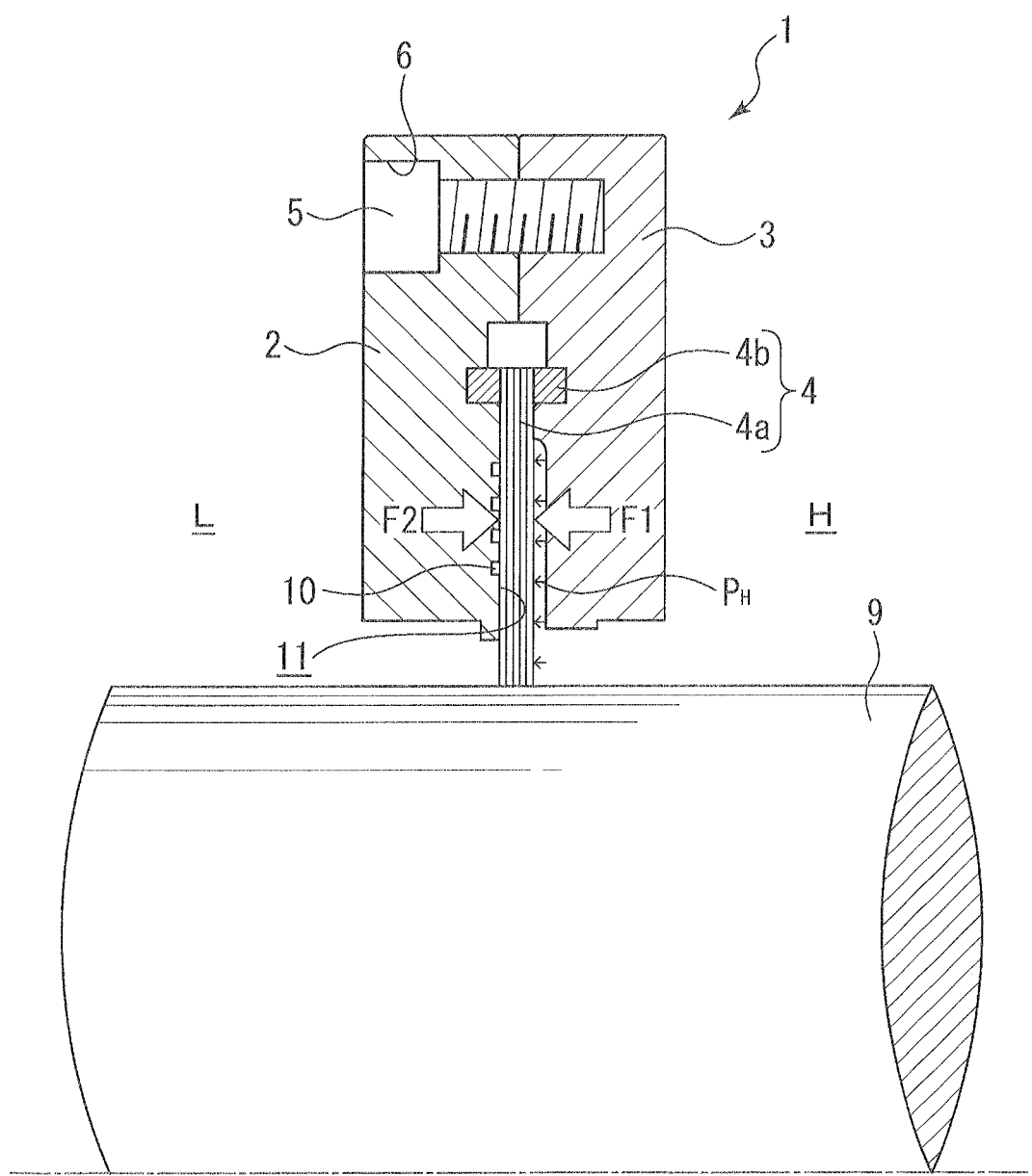
FIG. 1 is a cross-sectional view showing a first embodiment of the brush seal according to the present invention.
Figure 2:
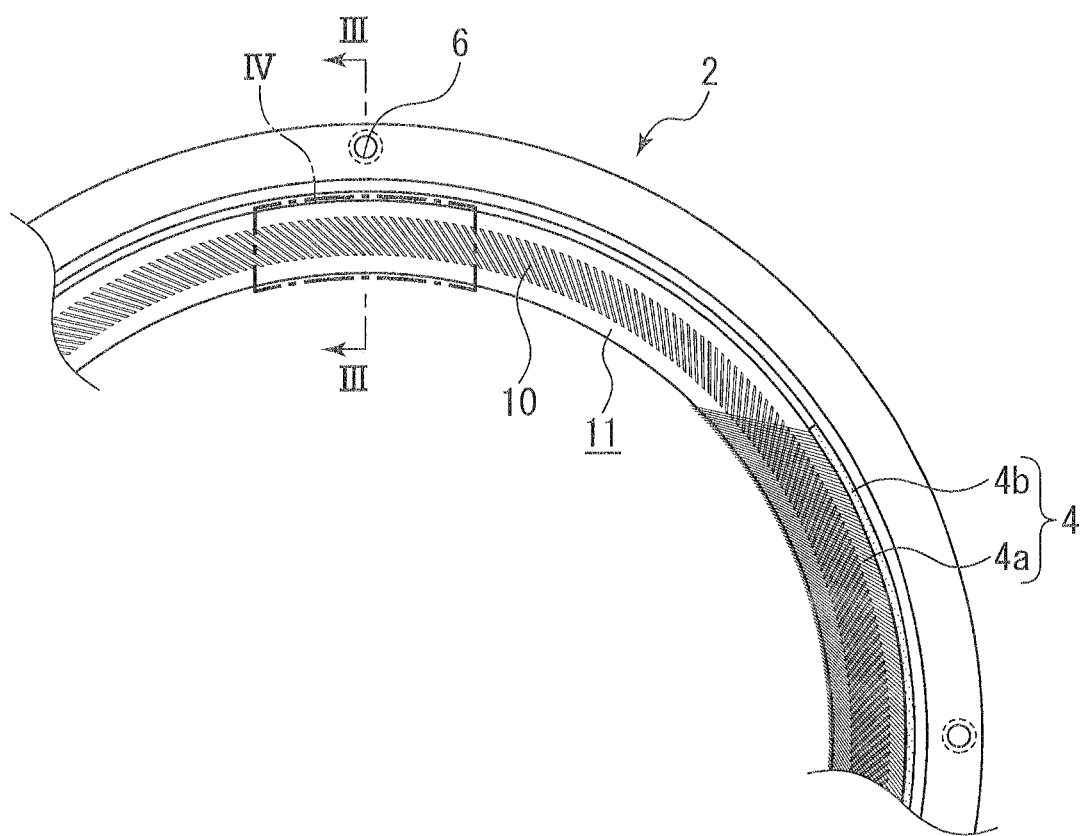
FIG. 2 is a front view of a back plate of FIG. 1, showing a state where a brush is attached to a portion of the back plate and for convenience illustrating the brush in a non-dense state.

FIG. 1 illustrates an example where a brush seal 1 is used for shaft seal in a rotary machine such as a turbine. An end of a brush 4 is brought close to or into contact with a rotor 9 of the rotary machine; thereby, a sealed gas such as vapor and fuel gas at a high-pressure side H inside the rotary machine is prevented from leaking to a low-pressure side L. Also, even if a relative distance between the rotor 9 and the end of the brush 4 is changed due to the eccentricity caused by whirling or the like of the rotor 9 or due to the volume change of the rotor 9 by heat, the entire brush 4 is radially deformed, thereby allowing the brush 4 to follow the change of the relative distance. Thus, wear of the end of the brush 4 is inhibited.

The brush seal 1 formed in an annular shape mainly includes a back plate 2 at the low-pressure side L, a side plate 3 at the high-pressure side H, and the brush 4. The back plate 2 and the side plate 3 are fixed by fastening with a bolt 5 that is inserted in a counterbored hole 6 so as to extend therethrough in a state where the brush 4 is interposed between the back plate 2 and the side plate 3. The brush 4 mainly includes a brush portion 4a formed of plural bristles and an attachment portion 4b formed by bundling the plural bristles and integrating ends of the bristles by welding or swaging. The brush 4 is formed to have a substantially hammer-shaped section. Further, each of the bristles having a wire diameter of 0.05 mm to 0.5 mm is made of a steel material, an alloy such as a nickel-base alloy or a cobalt-base alloy, or ceramics. Furthermore, the attachment portion 4b is made of metal. Also, the back plate 2 and the side plate 3 are made of stainless steel, but not limited thereto.

Grooves 10 are provided in the back plate 2 to be axially opposed to the brush 4, a pressure $P_H$ of gas at the high-pressure side H acts on the brush 4 and thereby the brush 4 is pushed against the back plate 2 by a pressing force F1. Meanwhile, the gas passing between the bristles of the brush 4 is mainly held in the grooves 10 and thereby the brush 4 is pushed against the side plate 3 by a pressing force F2. The pressing force F1 is totally or partially counteracted by the pressing force F2; therefore, the force acting between the brush 4 and a brush opposing surface 11 of the back plate 2 can be reduced. Accordingly, the brush 4 can be deformed and moved smoothly and radially.

Figure 3:
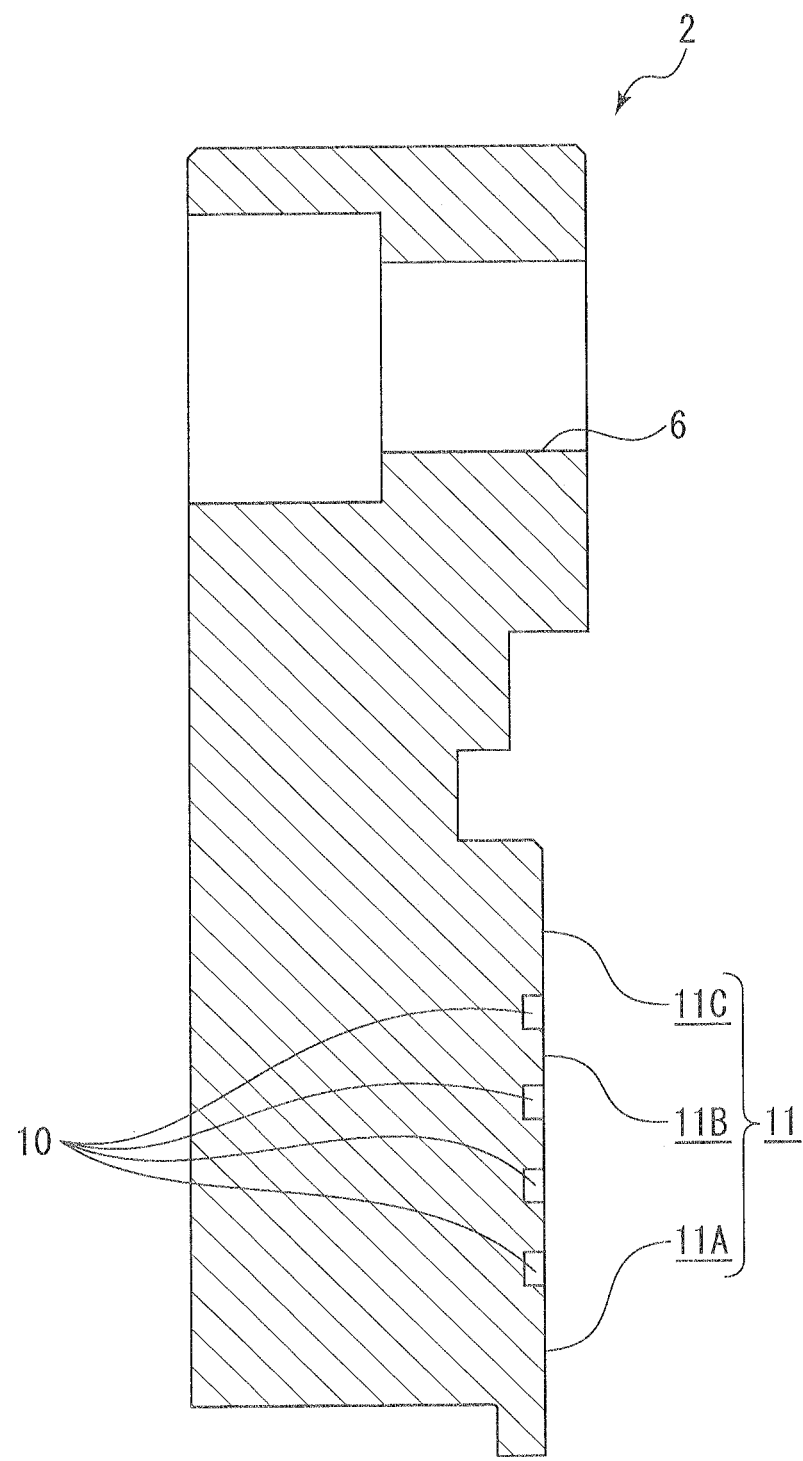
FIG. 3 is a cross-sectional view of the back plate, taken along the line of FIG. 2.
Figure 4:
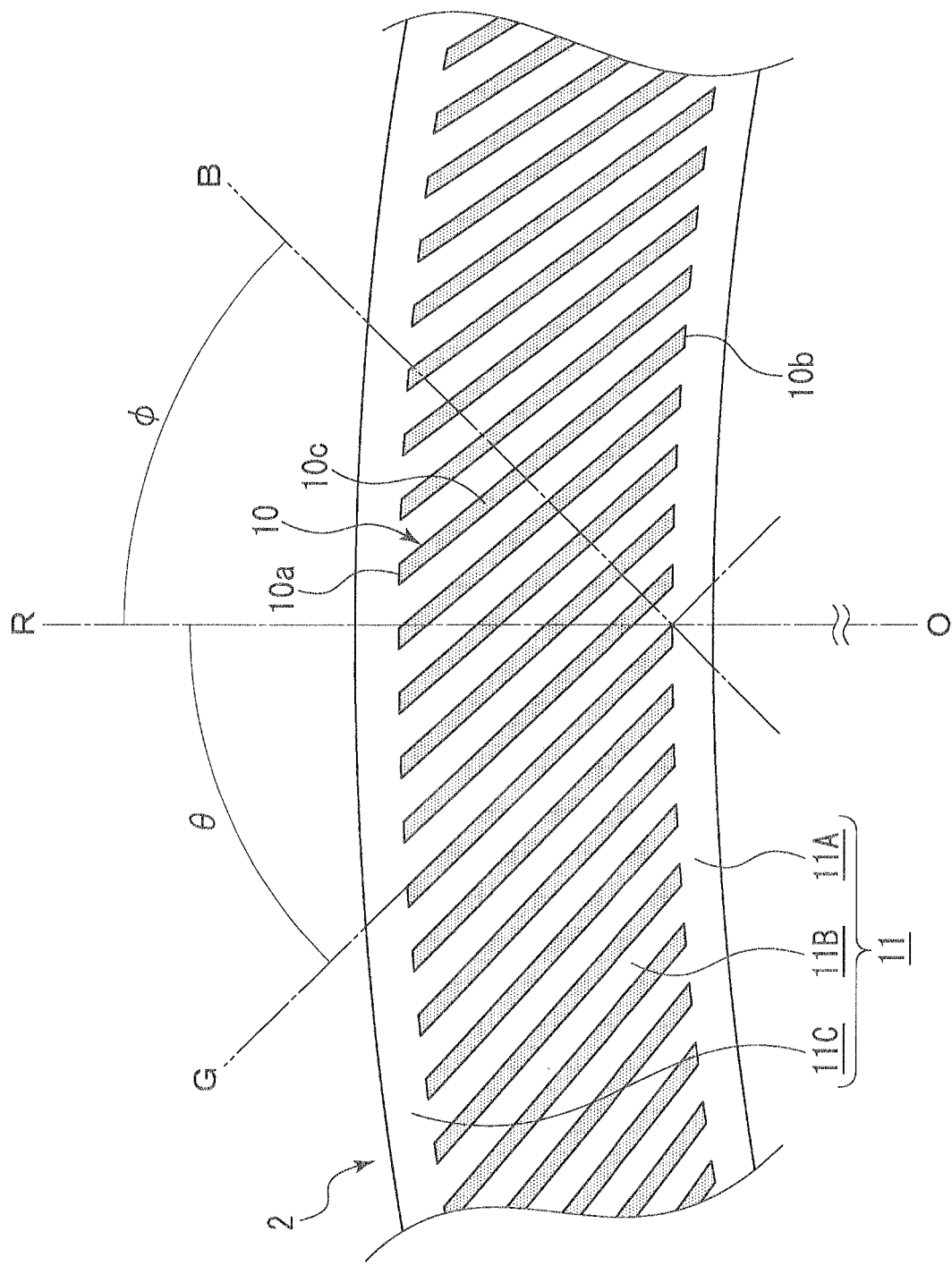
FIG. 4 is an enlarged view of a portion IV of the back plate of FIG. 2 and hatched portions show recessed portions.

Next, the grooves 10 will be described in detail mainly with reference to FIGS. 3 and 4. The grooves 10 each formed in the same shape of a substantially parallelogram are circumferentially arranged at equal intervals in the brush opposing surface 11. Each groove 10 is formed in a substantially linear shape such that radially opposite end portions 10a, 10b of a linear portion 10c each has a slanted angular shape in planar view. The grooves 10 are formed separately from each other. A radially inner land surface 11A, groove in-between land surfaces 11B, and a radially outer land surface 11C are arranged around each of the grooves 10. The radially inner land surface 11A is formed to continuously extend circumferentially; thereby, when the rotary machine is in use, the gas stored in the grooves 10 is prevented from leaking from the radially inner side to the low-pressure side. The circumferential length of each of the groove in-between land surfaces 11B is preferably designed to be longer than the circumferential length of the groove 10. Accordingly, a wide area of the groove in-between land surfaces 11B with which the brush 4 comes into contact can be secured; therefore, a force per unit area acting from the brush 4 on the groove in-between land surfaces 113 can be reduced. Also, preferably, the radially inner land surface 11A, the groove in-between land surfaces 113, and the radially outer land surface 11C are each a flat surface and are flush with one another. Further, edges between the grooves 10 and the radially inner land surface 11A, between the grooves 10 and the groove in-between land surfaces 113, and between the grooves 10 and the radially outer land surface 11C are chamfered or round-shaped. Therefore, the brush 4 is prevented from being worn by the edges. Furthermore, the length, width, and depth of each of the grooves 10 may be determined according to the specification of a fluid device and may be respectively set as about several tens of millimeters, about several millimeters, and about several tenths of a millimeter.

The grooves 10 are provided on the brush opposing surface 11 to be inclined with respect to a radial direction R, and an angle θ formed by an extending direction G of each of the grooves 10 and the radial direction R is substantially 45 degrees. In other words, the extending direction G is also inclined substantially at 45 degrees with respect to the circumferential direction on the brush opposing surface 11 (exactly, the groove is inclined substantially at 45 degrees with respect to a tangent line to the circumference). Further, the brush 4 is provided to be inclined with respect to the radial direction R on the brush opposing surface 11, and an angle φ formed by an extending direction B of the brush 4 and the radial direction R is substantially 45 degrees. The groove 10 and the brush 4 are inclined to the opposite sides from each other with respect to the radial direction R; therefore, the extending direction G and the extending direction B are substantially perpendicular to each other.

Figure 8:
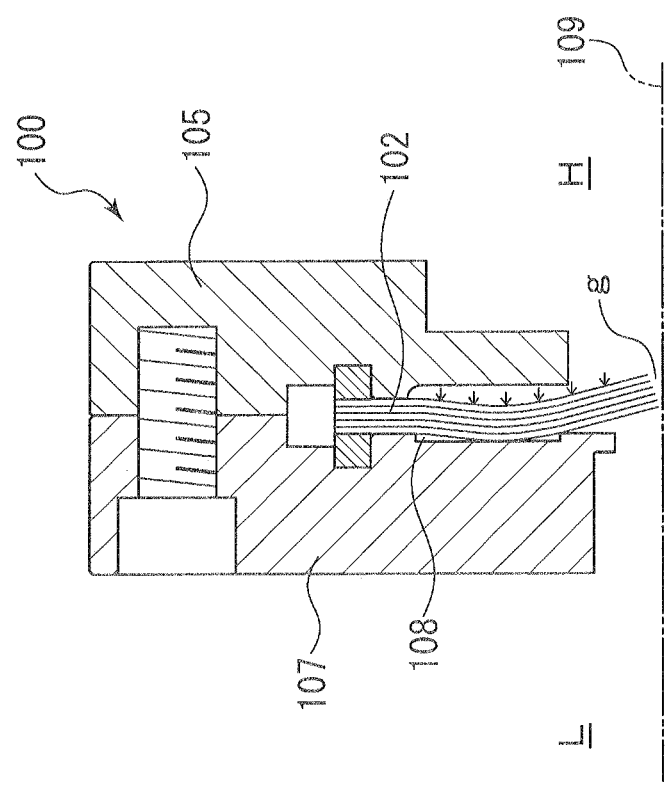
FIG. 8 is a cross-sectional view illustrating the usage state of the brush seal of FIG. 7.

The grooves 10 are inclined with respect to the circumferential direction and the brush 4; therefore, a lot of grooves are arranged in opposition to any row of the axially aligned bristles of the brush 4. In an example of FIG. 4, the approximately eight grooves, the single radially inner land surface 11A, the single radially outer land surface 11C, and the seven groove in-between land surfaces 11B are arranged with respect to the extending direction B of the brush 4. Thus, the brush 4 is axially supported by many more groove in-between land surfaces 11B, each of which is located between the grooves 10 and in contact with the brush 4, and the force from the gas in the multiple grooves 10 acts in the direction F2 (FIG. 1) on the brush 4. Accordingly, an axial deflection of the brush 4 is small and a gap g (FIG. 8, FIG. 9) is not generated; therefore, the leakage of the gas can be inhibited.

Figure 9:
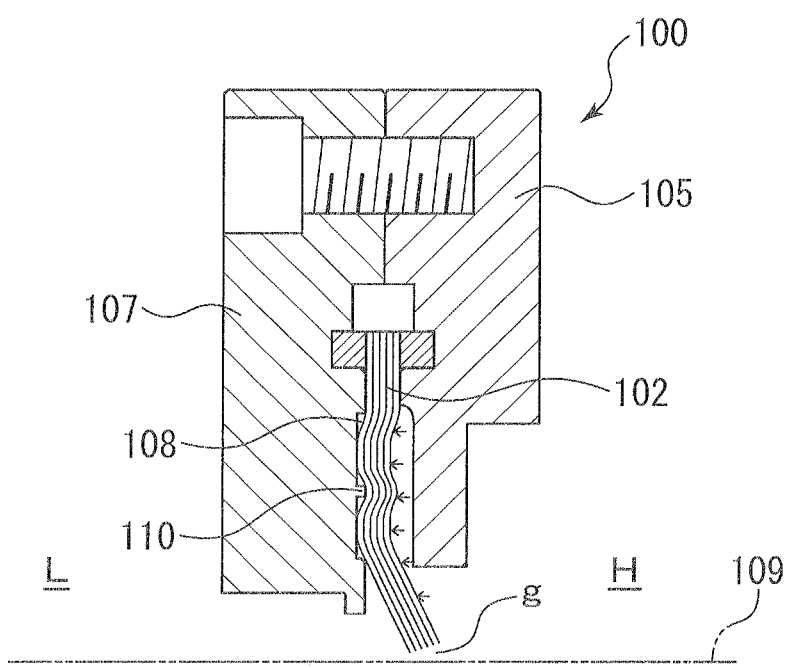
FIG. 9 is a cross-sectional view illustrating the usage state of another conventional brush seal.

Also, the brush 4 is axially supported by the multiple groove in-between land surfaces 11B, each located between the grooves 10, so as to come into contact with the groove in-between land surfaces 11B; therefore, the pressing force F1 acting on the brush 4 can be dispersedly received. A portion of the brush 4 on which the large pressing force F1 (FIG. 1) acts varies radially depending on the usage condition or timing. Accordingly, the large pressing force does not consistently act on the same groove in-between land surface 11B and thus the brush 4 can be prevented from being worn and cut by the edges of the groove in-between land surfaces 11B. On the other hand, the brush seal 100 shown in FIG. 9 is provided with the single supporting portion 110. Accordingly, even if the pressing force F1 acting on the brush 102 varies radially depending on the use condition or timing, the brush 102 is consistently in contact with the supporting portion 110 and is thus likely to be worn and cut.

Also, since the grooves 10 are inclined with respect to the circumferential direction, even the gas passes through the brush 4 to be introduced from any portions in the radial direction into the grooves 10 and is thereafter radially guided. Accordingly, contrary to the circumferential double groove 108 shown in FIG. 9, even if the gas is introduced from any portions in the radial direction into the grooves 10, pressure is radially guided and therefore a reaction force from the grooves 10 can be uniformed in the radial direction.

Further, the extending direction B of the brush 4 and the extending direction G of the groove 10 are inclined to the opposite sides from each other with respect to the back plate 2 and at 45 degrees with respect to the radial direction R. With such an arrangement, many more grooves 10 can be arranged in opposition to any row of the axially aligned bristles of the brush 4. In addition, the inclination angle of the brush 4 varies in accordance with the operating condition of a rotary machine; however, during the operation (while the rotor 9 is rotating), the brush 4 is preferably arranged to be inclined substantially at 45 degrees with respect to the radial direction R.

Figure 5A:
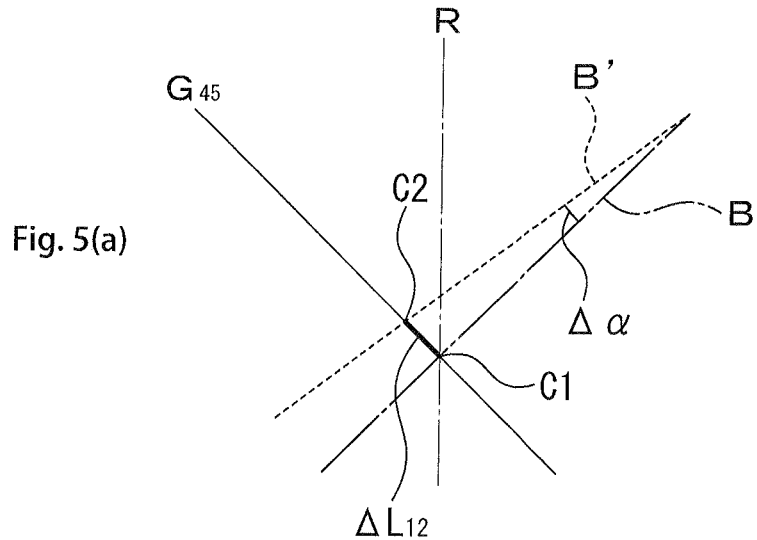
Figure 5B:
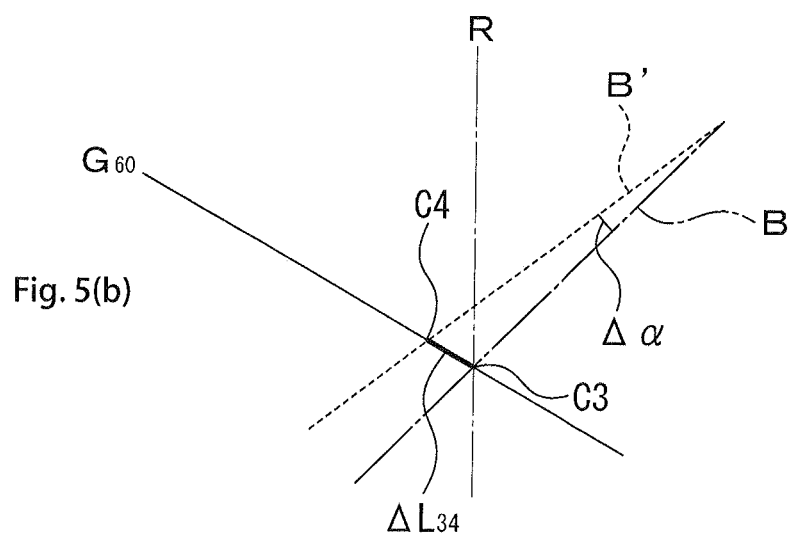

A difference between inclination angles of the grooves 10 will be described with reference to FIG. 5. In FIG. 5(a), an extending direction $G_{45}$ of the groove 10 is inclined at 45 degrees with respect to the radial direction. The extending direction B of the brush 4 is inclined to the opposite side of the groove 10 and at 45 degrees with respect to the radial direction. From such a condition, the brush is slightly moved and then extends in an extending direction B'. In this case, the brush 4 is moved along the brush opposing surface 11 by Δ α while traversing the groove 10 from a point C1 to a point C2, that is, the moving distance of the brush 4 on the groove 10 is $\Delta L_{12}$. Likewise, in FIG. 5(b), an extending direction $G_{60}$ of the groove 10 is inclined at 60 degrees with respect to the radial direction. The extending direction B of the brush 4 is inclined to the opposite side of the groove 10 and at 45 degrees with respect to the radial direction. From such a condition, the brush is slightly moved and then extends in the extending direction B'. In this case, the brush 4 is moved along the brush opposing surface 11 by Δ α while traversing the groove 10 from a point C3 to a point C4, that is, the moving distance of the brush 4 on the groove 10 is $\Delta L_{34}$. In addition, from the geometric relation, the moving distance $\Delta L_{12}$ is shorter than the moving distance $\Delta L_{34}$. Thus, the closer an intersecting angle between the extending direction G of the groove 10 and the extending direction B of the brush 4 is to an orthogonal angle, the shorter the distance in which the brush 4 traverses the groove 10 while being moved is. As a result, the brush 4 is less likely to be worn and the durability thereof increases.

Furthermore, the plural grooves 10 are formed in the same shape and circumferentially arranged at equal intervals; therefore, the pressure acting from the grooves 10 on the brush. 4 uniformly acts in the extending direction B of the brush 4. Consequently, an axial deflection of the brush 4 can be further reduced.

Second Embodiment

Figure 6:
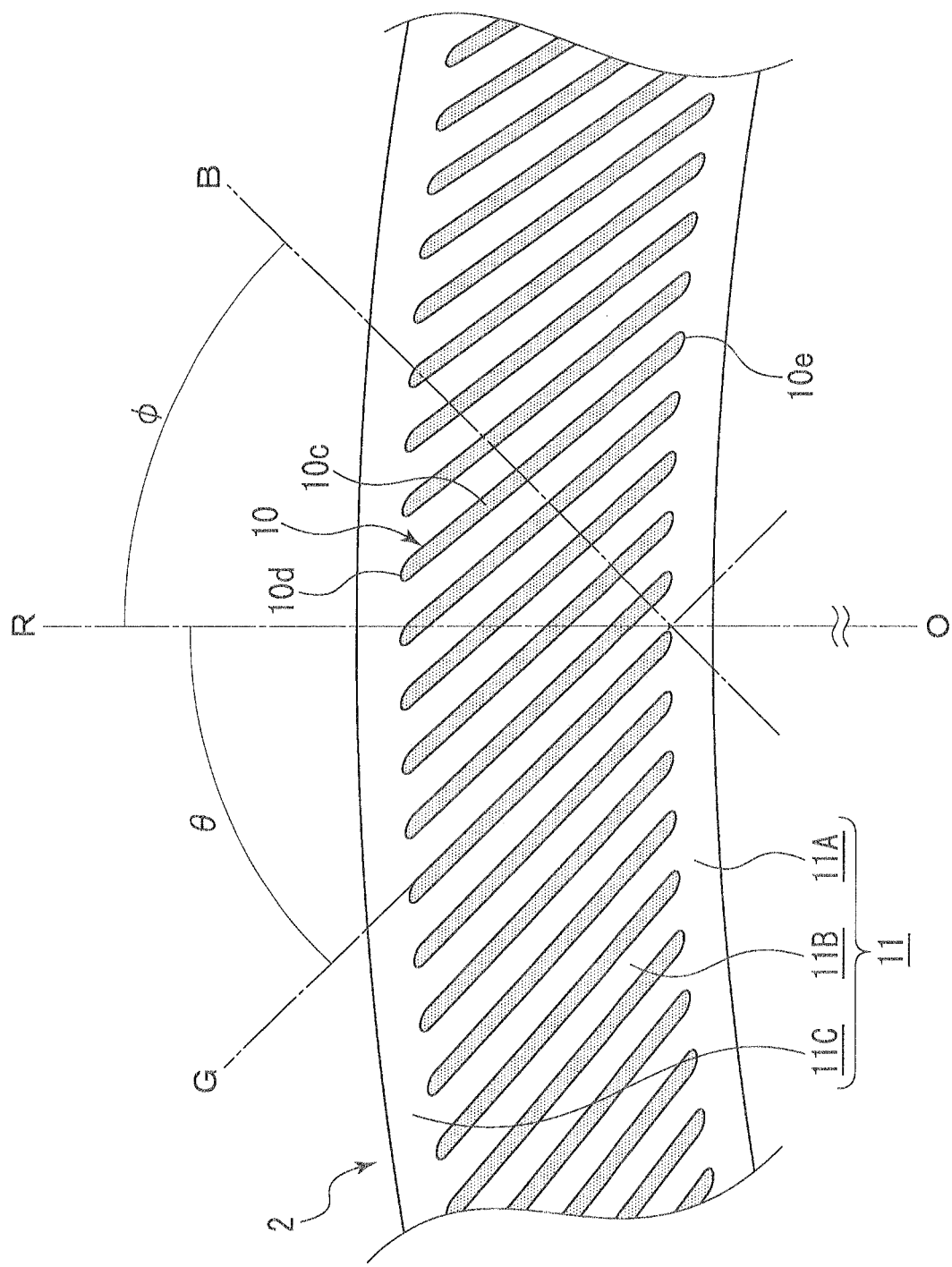
FIG. 6 is an enlarged view of a back plate in a second embodiment of the brush seal, in which hatched portions show recessed portions.
Figure 7:
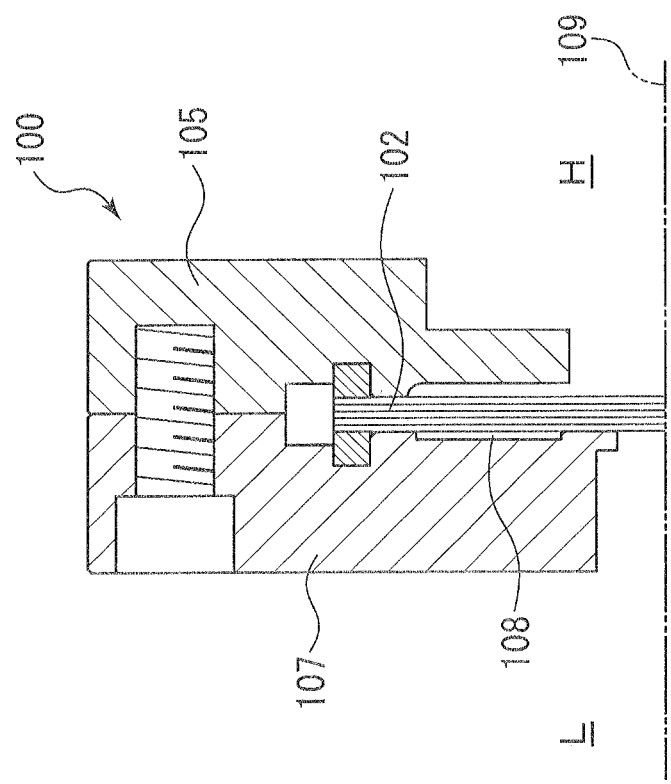
FIG. 7 is a cross-sectional view showing a conventional brush seal.

Next, the second embodiment of the brush seal will be described with reference to FIG. 6. In the first embodiment, the radially opposite end portions 10a, 10b of the linear portion 10c of the groove 10 each has the slanted angular shape in planar view. Meanwhile, in the second embodiment, radially opposite end portions 10d, 10e each has an arc shape in planar view. Further, other configurations are the same as those of the first embodiment and therefore descriptions thereof will be omitted. As described above, since the radially opposite end portions 10d, 10e each has the arc shape in planar view, sharp edges are not provided at the end portions. Therefore, even when the brush 4 slides along the brush opposing surface 11, the possibility that the brush 4 is worn by the radially opposite end portions 10d, 10e can be reduced.

As described above, the embodiments of the brush seal according to the present invention have been described by the drawings. Specific configurations are not limited to these embodiments, and even if changes or additions are made without departing from the scope of the present invention, the changes or additions may be included in the present invention.

For example, an example where the grooves 10 are each inclined at 45 degrees with respect to the circumferential direction is described in the foregoing embodiment. As long as each of the grooves 10 is inclined with respect to the circumferential direction and with respect to the extending direction B of the brush 4, the groove 10 may be applicable. Further, the extending direction G of the groove 10 and the extending direction B of the brush 4 are preferably located to the opposite sides from each other with respect to the radial direction R. Therefore, far more grooves 10 can be arranged in opposition to any row of the axially aligned bristles of the brush 4, and in addition, the brush 4 is less likely to enter the grooves 10 therealong. The brush 4 enters the grooves 10 threalong whereby sealing performance may deteriorate and the brush 4 may be worn by contact with the edges of the grooves 10.

Also, the groove 10 formed substantially in a linear shape has been described as an example. The groove 10 may be formed in a curved shape having a curved surface. In the case of the curved shape, the groove 10 may be arranged such that the long side of the outer shape intersects with the circumferential direction of the back plate 2 and with the extending direction of the brush 4.

Also, the groove 10 having the substantially uniform width has been described as an example. Alternatively, the width of the groove 10 may vary in the extending direction.

Furthermore, an example where the grooves 10 having the linear shape are formed separately from one another has been described. Alternatively, grooves connected to one another may be applicable.

REFERENCE SIGNS LIST

1 Brush seal
2 Back plate
3 Side plate
4 Brush
4a Bristle
4b Attachment portion
10 Groove
11 Brush opposing surface
11A Radially inner land surface
11B Groove in-between land surface
11C Radially outer land surface
H High-pressure side
L Low-pressure side
G Extending direction of groove
B Extending direction of brush
R Radial direction
θ Inclination angle of groove
φ Inclination angle of brush

The invention claimed is:

1. A brush seal comprising:
a brush formed of a bunch of a plurality of bristles;
an annular back plate arranged at a low-pressure side of the brush and provided with a plurality of grooves into which a sealed fluid is to be introduced; and
a front plate arranged at a high-pressure side of the brush, wherein
the plurality of grooves are inclined with respect to a circumferential direction of the back plate and with respect to an extending direction of the brush;
the plurality of grooves are formed separately from each other in a non-continuous manner, and
all of the plurality of grooves are defined by a land having a land surface consisting of a radially inner land surface positioned inside radially inner ends of the plurality of grooves, mid land surfaces each positioned between adjoining two of the plurality of grooves, and a radially outer land surface positioned outside radially outer ends of the plurality of grooves,
each of the mid land surfaces is connected to and flush with the radially inner land surface and the radially outer land surface,
the radially inner land surface is continuously formed over entire a circumference of the back plate on a radially inner side of the plurality of grooves,
the plurality of grooves are formed in a same shape and arranged at equal intervals in the circumferential direction,
the brush and the plurality of grooves are inclined to opposite sides from each other with respect to a radial direction of the back plate,
the front plate directly contacts a proximal end of the bristles,
the back plate directly contacts the bristles, and
each of the mid land surfaces has a circumferential length larger than a circumferential length of each of the plurality of grooves.

2. The brush seal according to claim 1, wherein the plurality of grooves are provided to be inclined at 45 degrees with respect to the circumferential direction of the back plate.

* * * * *